No. 696,623. Patented Apr. 1, 1902.
J. T. BENDER.
CULTIVATOR.
(Application filed Sept. 4, 1900.)
(No Model.)
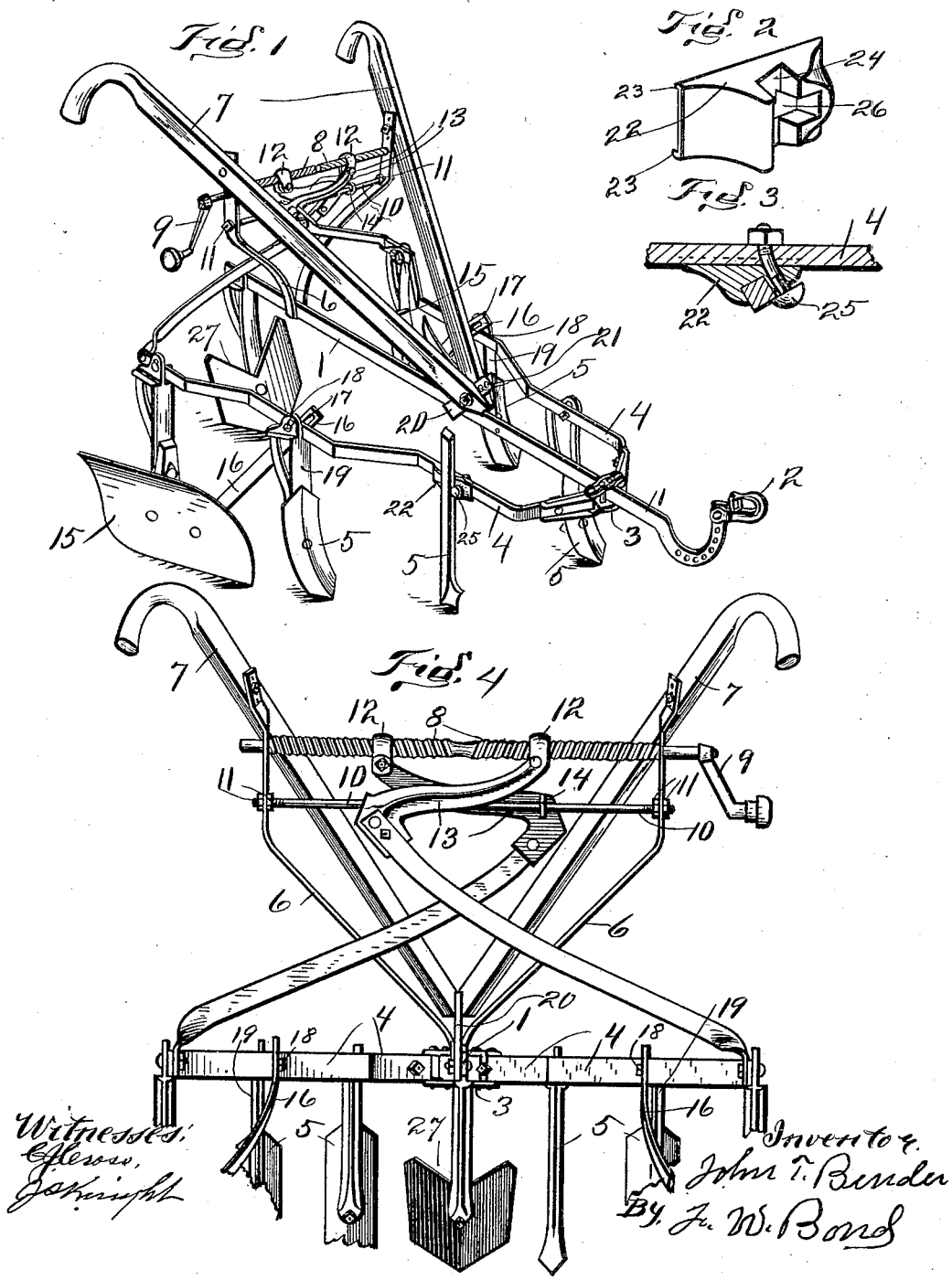

UNITED STATES PATENT OFFICE.

JOHN T. BENDER, OF CANTON, OHIO.

CULTIVATOR.

SPECIFICATION forming part of Letters Patent No. 696,623, dated April 1, 1902.

Application filed September 4, 1900. Serial No. 28,949. (No model.)

*To all whom it may concern:*

Be it known that I, JOHN T. BENDER, a citizen of the United States, residing at Canton, in the county of Stark and State of Ohio, have invented certain new and useful Improvements in Cultivators; and I do hereby declare that the following is a full, clear, and exact description of the same, reference being had to the annexed drawings, making a part of this specification, and to the figures of reference marked thereon, in which—

Figure 1 is a perspective view of my invention. Fig. 2 is a detached view of one of the toothed holding-blocks. Fig. 3 is a longitudinal section showing a portion of one of the cultivator-arms and a section of the tooth-holding block, showing the tooth-bar and its clamping-bolt properly located. Fig. 4 is a rear end view of the cultivator.

The present invention has relation to cultivators; and it consists in the different parts and combination of parts hereinafter described, and particularly pointed out in the claims.

Similar numerals of reference indicate corresponding parts in all the figures of the drawings.

In the accompanying drawings, 1 represents the center or draft bar, to the front or forward end of which is attached the connecting-link 2, which is of ordinary construction.

To the front or forward portion of the draft-bar 1 is connected in any convenient and well-known manner the head 3, to which head are hinged the side bars 4, which side bars extend rearward and may be of the form shown, or they may be of any other desired form, inasmuch as the object and purpose hereinafter described can be carried out without any particular reference to the exact construction of the side bars 4.

To the side bars 4 are connected the cultivator-teeth 5, which teeth may be of the form shown, or they may be of any other desired form, or ordinary cultivator-shovels may be substituted for the teeth shown.

To the center bar 1 are connected in any convenient and well-known manner the braces or handle-supports 6, which handle-supports are shown so located and adjusted that they will support and hold the handles 7 in proper position.

To the top or upper portion of the handle-supports 6 is journaled the right and left hand screw-threaded shaft, which right and left hand screw-threaded shaft is provided with right-hand screw-threads upon one side of the vertical center of the cultivator proper and left-hand screw-threads upon the opposite sides thereof, and for the purposes hereinafter described the shaft 8 is provided with the crank 9 or its equivalent.

Directly below the screw-threaded shaft 8 is located the bar 10, which bar is securely attached to the handle-supports 6 by means of the screw-threaded nut 11, located upon screw-threaded portion of the bar 10.

Upon the screw-threaded shaft 8 are located the screw-threaded blocks 12, said screw-threaded blocks being provided with screw-threads corresponding with the screw-threads upon the shaft 8, one of said blocks having a right-hand screw-thread and the other a left-hand screw-thread.

To the screw-threaded blocks 12 are attached or formed integral therewith the arms 13, which arms extend downward and their bottom or lower ends connected to the cultivator-bars 4 in any convenient manner, preferably by bolting. Each of the arms 13 is provided with eyes or staples 14, said eyes or staples being located upon the bar 10, as illustrated in Fig. 4, and are so located for the purpose of causing the arms to move back and forth in a true horizontal line or in line with the bar 10 and at the same time hold said arms 13 in a rigid condition.

It will be understood that as the screw-threaded shaft 8 is rotated in one direction the screw-threaded blocks will be moved away from each other, and when rotated in the opposite direction they will be moved or brought toward each other, thereby carrying with said blocks the arms 13, which in turn move the bottom or lower ends of said arms to or from each other, reference being had to the direction of rotation of the screw-threaded shaft 8.

The object and purpose of providing for the above-described adjustment is to regulate the width of the cultivator proper or, in other words, to move the cultivator-bars 4 to or from each other at their rear ends.

To the rear ends of the bars 4 are connected in the usual manner the hiller or shovel blades 15, and for the purpose of holding said hiller or shovel blades 15 at the desired angularity the bars 16 are provided, and for the purpose of adjusting the angularity of said hiller or shovel blades with reference to the line of draft the upper or inner ends of the bars 16 are provided with the elongated slots 17, through which elongated slots suitable clamping-bolts 18 are passed, which clamping-bolts may also be used to properly connect the shank 19 of the rear tooth 5, this being a matter of judgment only.

It will be understood that by providing the bar 16 the hiller or shovel blades 15 will be held in a rigid condition regardless of the angle to which they are adjusted. It will also be understood that by my peculiar arrangement of adjusting the rear ends of the bars 4 to or from each other the tiller or shovel blades 15, together with the different teeth connected thereto, will be moved back and forth or adjusted to or from each other without disturbing in any manner the individual adjustment of the teeth and hiller or shovel blades.

To the draft-bar 1 is attached the post 20, which post is provided with a series of apertures 21, said apertures being for the purpose of elevating or lowering the forward ends of the handles 7, thereby elevating or lowering the rear ends of the handles 7, thereby providing a means for adjusting the handles 7 to or from the ground at their rear end.

To the bars 4 are connected the teeth-holding blocks 22, which holding-blocks are provided with the flanges 23, which flanges fit upon the bottom and upper edges of the bars 4. The blocks 22 are each provided with the recess 24, into which recess the shank of one of the blades 5 is placed and the clamping-bolt 25 extended through the aperture 26 and is so located that it will bind the shank of the tooth 5.

It will be understood that by my peculiar arrangement the teeth 5 can be attached up or down and held at any secure point of adjustment.

For the purpose of assisting in producing a rigid connection between the shaft 8 and the hinged bars 4 the arms 13 are bent or curved at their upper portions, and their upper portions cross or lap over each other, the lower portions of said arms being crossed or lapped over each other below the upper curved portions, by which arrangement a greater amount of adjustment is provided for the hinged arms 4.

The rear end of the center bar 1 may, if desired, be provided with shovel-blade 27, which shovel-blade is of ordinary construction and forms no particular part of the present invention.

Having fully described my invention, what I claim as new, and desire to secure by Letters Patent, is—

1. In a cultivator the combination of a center bar, a head connected thereto, hinged bars connected to the head located upon the center bar, handle-supports fixed to the hinged bars, a right and left screw-threaded shaft journaled to the handle-supporting bars, right and left hand screw-threaded eyes located upon the screw-threaded shaft, and arms connected to the eyes and to the hinged bars and handles carried by the handle-supports, substantially as and for the purpose specified.

2. The combination of a cultivator-frame consisting of two hinged bars and a center bar, a left and right handed screw-threaded shaft located between the cultivator-handles, handle-supports having connected thereto, a rod, arms provided with right and left hand screw-threaded eyes, said arms provided with staples to engage the rod connected to the handle-supports, substantially as and for the purpose specified.

In testimony that I claim the above I have hereunto subscribed my name in the presence of two witnesses.

JOHN T. BENDER.

Witnesses:
J. A. JEFFERS,
F. W. BOND.